United States Patent [19]
Bates et al.

[11] 3,922,688
[45] Nov. 25, 1975

[54] STRIP-CHART RECORDER

[75] Inventors: David A. Bates, Willoughby; Gary L. Christopher, Middleburg Heights; George R. Hall, II, Euclid, all of Ohio

[73] Assignee: Bailey Meter Company, Wickliffe, Ohio

[22] Filed: July 22, 1974

[21] Appl. No.: 491,169

[52] U.S. Cl. .............................. 346/136; 346/145
[51] Int. Cl.² ....................................... G01D 15/30
[58] Field of Search .......................... 346/136, 145

[56] References Cited
UNITED STATES PATENTS

| | | | |
|---|---|---|---|
| 2,594,136 | 4/1952 | DiMaggio | 346/145 X |
| 2,924,499 | 2/1960 | Young et al. | 346/145 |
| 3,579,248 | 5/1971 | McGrath | 346/136 X |

*Primary Examiner*—Joseph W. Hartary
*Attorney, Agent, or Firm*—John F. Luhrs

[57] ABSTRACT

This recording apparatus for strip-chart records includes different self-contained chart transport cartridges that interchangeably engage with chart drive, stylus control and indicator tape mechanisms incorporated in a common control assembly. A wide-display recorder cartridge includes a supply roll spindle, a sheath plate, a drive sprocket, and a friction-driven chart take-up spindle to display an extended portion of the chart record. A Z-fold recorder cartridge includes a chart supply compartment, a drive sprocket, a cylindrical sheath platen, a guide member spring-loaded against the recording chart at its egress from the drive sprocket, and a take-up chamber having a floor which slopes away from the drive sprocket and having a ribbed wall to retain the folds of the recorded chart and to provide for review of intervals of the record.

8 Claims, 4 Drawing Figures

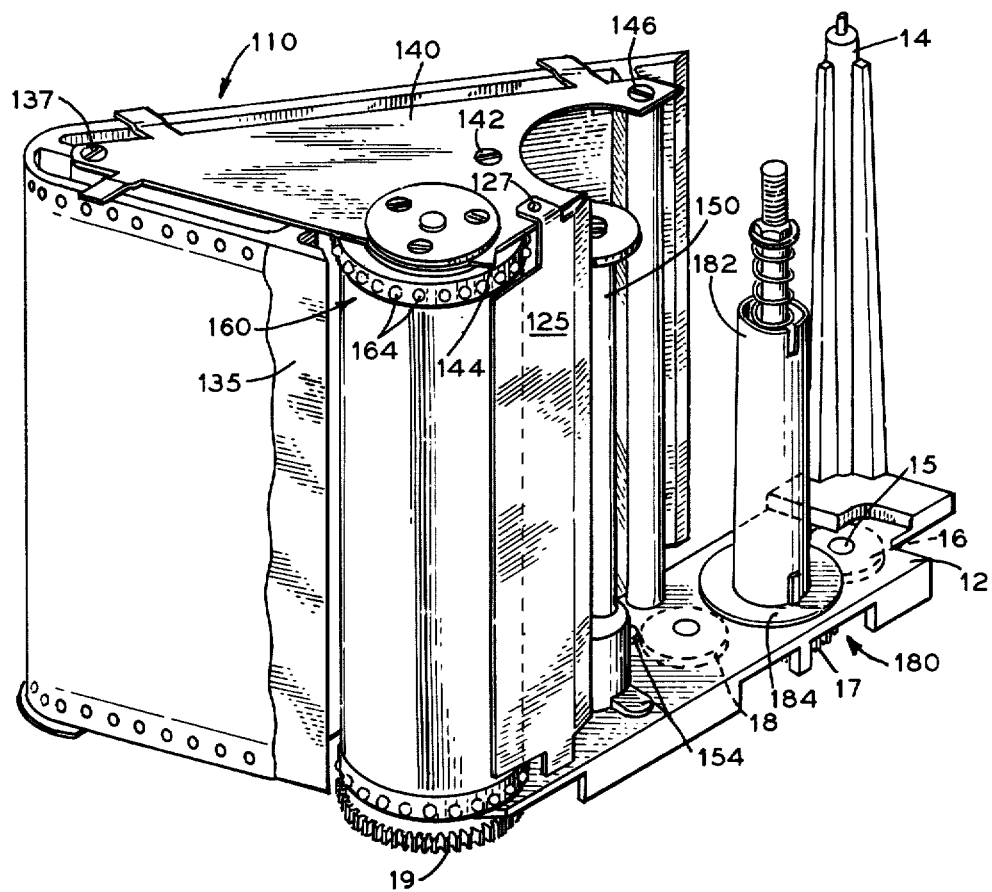
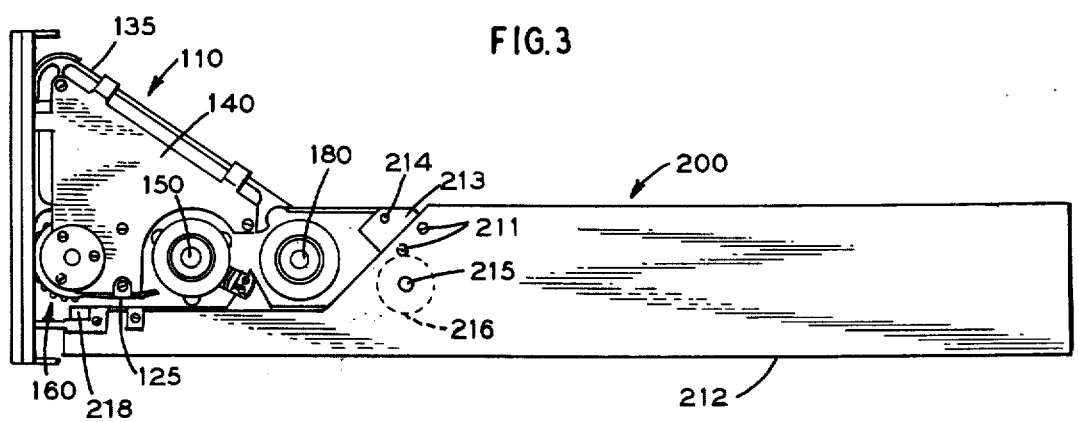

STRIP-CHART RECORDER

BACKGROUND OF THE INVENTION

This invention relates to cartridge apparatus for containing, transporting and recording on strip chart records.

More particularly the invention relates to improved apparatus for containing and horizontally transporting Z-folded strip chart records in process recorders.

Presently known recording and transporting apparatus for strip charts include a fixed mechanism for transporting the chart record along a surface or an edge to a recording stylus. The chart is then usually delivered through an exit chute to a bin or drawer or to a stacking mechanism. Either gravity or a drive mechanism is employed to cause the record to automatically refold along the original Z-folded configuration. Examples of such apparatus may be seen in U.S. Pat. No. 2,446,400 issued to the assignee hereof, in U.S. Pat. No. 3,080,561 issued Mar. 5, 1963, and in U.S. Pat. No. 3,646,569 issued Feb. 29, 1972.

Another type of recorder apparatus for Z-folded chart records supports the chart record along an edge thereof in a supply bin and employs a drive roller which pulls the record past a knife edge at the recording stylus and then propels it to a power driven stacking mechanism. An example of this type recorder may be seen in U.S. Pat. No. 3,579,248, issued on May 18, 1971. This recorder, however, subjects the record chart to rather high levels of tension between the supply bin and the drive roller, which unduly stretches open the folds in the chart. This tension on the chart is both high in force and is maintained over a long period of time unless the chart moves rapidly through the recorder. This high degree of tension requires that either a stiff chart record which has tightly creased Z-folds be employed or that a power driven refolding or stacking mechanism by employed to force the chart into the receiving bin.

Another disadvantage of such horizontal transporting chart recorders is that the mechanisms for driving the chart and for refolding the chart must be synchronized or driven at the same rate, which would be different for different size charts and different widths of folds in such charts and difficult to predict. Also, the tension on the chart in such arrangements must be adjusted to stretch the folds sufficiently without destroying the "memory" of the folds so that it can be refolded readily.

In some such apparatus a supply bin of undersized width is employed into which the chart record is force-fitted behind a narrow opening to assure that one fold at a time is pulled out of the bin to be fed through the device. Such apparatus may be useful for laboratory recorders which record at a relatively high rate along the chart record, but such high speed is not necessary for the usual process recording operation and would be prohibitively expensive, therefore, due to its complexity.

Another disadvantage of these recorders is that the chart drive means and the motor mechanism therefor are intimately associated with the chart transport mechanism itself. The replacement of parts in the mechanisms and even the threading or insertion of new chart records into the apparatus, is, therefore, a complicated or laborious task. Furthermore, a different recorder is necessary for strip charts of different size or for the display of different widths of the chart record, for example, which introduces undesirable expense and inventory difficulties for the manufacturer and user alike.

SUMMARY OF THE INVENTION

Accordingly, it is an object of this invention to unfold, transport and automatically refold Z-folded record charts in a recorder without undue tension on the folds in the chart for preserving the spring "memory" of the folds.

Another object of the subject invention is to avoid the use of a driven stacking mechanism for refolding a Z-folded record chart, after having been recorded, into a receiving stack or take-up bin.

A further object of the invention is to provide a chart recording apparatus for Z-fold chart records which is simple and inexpensive and to provide a family of chart drive cartridges or mechanisms for use with a standard drive or control assembly.

Accordingly, the invention encompasses different cartridges or mechanisms for containing, transporting and storing strip chart records which can be mated with substantially identical drive or control assemblies. Further, the invention includes a cartridge or mechanism for unfolding, transporting and refolding Z-folded record charts in which the chart is held open at the drive means for recording and tension on the folds of the chart is reduced.

BRIEF DESCRIPTION OF THE DRAWINGS

In the drawings,

FIGS. 1 and 2 are isometric views of cartridges for containing, transporting and storing Z-folded and rolled records charts, respectively, and FIGS. 3 and 4 are views of a cartridge for transporting, recording, and displaying a long portion of a rolled chart, mated with a drive control assembly.

DESCRIPTION OF THE PREFERRED EMBODIMENTS

Figure 1:
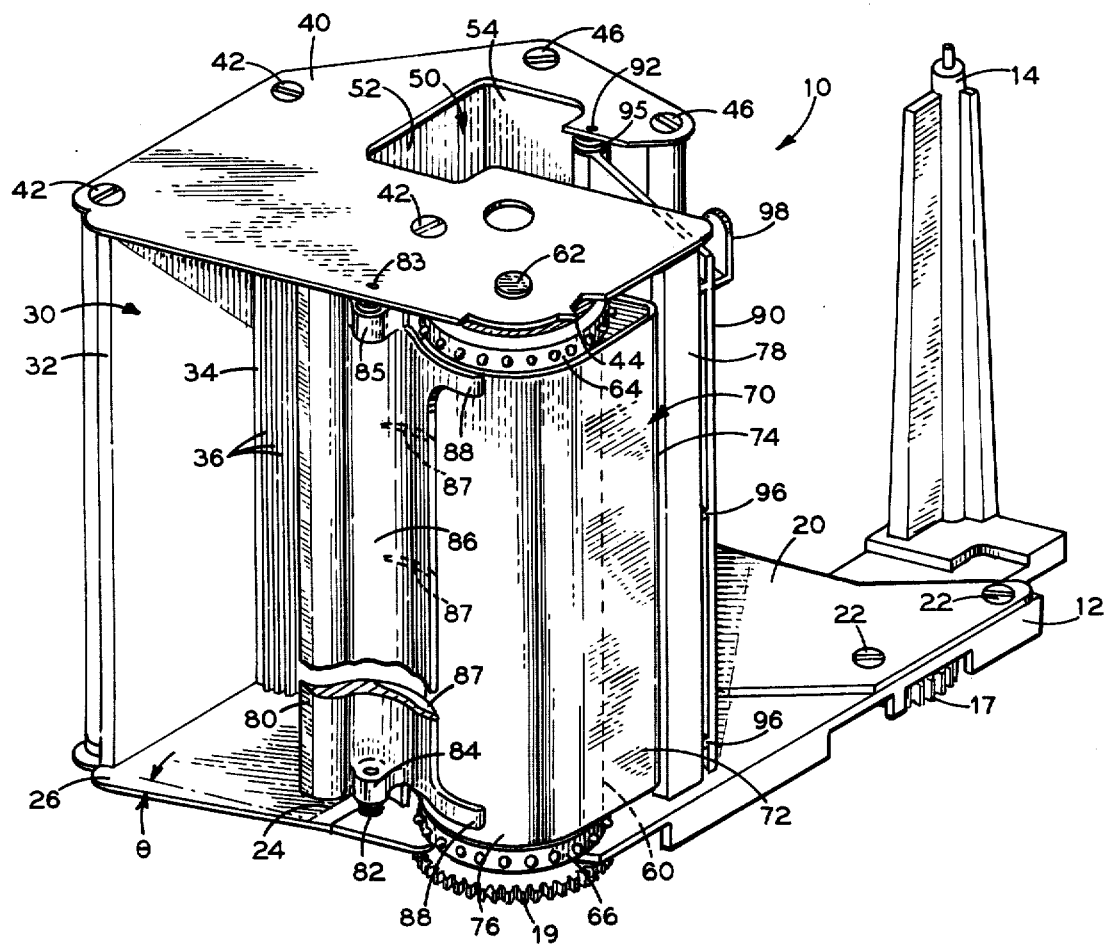

Referring to FIG. 1, there is illustrated a chart transport cartridge 10 for Z-folded charts. The cartridge includes a transport chassis 12 bearing a support post 14 for joining the cartridge to a drive assembly (not shown). Transport chassis 12 includes a gear train journalled to it and includes a gear 16 (not shown) for engagement with the drive source and a driven gear 19 to which it is coupled by several idler gears including gear 17 or, alternatively, by a toothed belt or by a timing chain, for example.

A base plate 20 is supported on chassis 12 and is attached thereto by fasteners 22. Base plate 20 is bent along a line 24 to provide a floor 26 which slopes downwardly therefrom at an angle $\theta$ as an extension of the base plate.

A take-up chamber 30 is defined by a side wall 32 and a back wall 34 which are attached to a top plate 40 and the base plate by bolts 42, or the like. Back wall 34 bears a plurality of vertically oriented ribs 36 which protrude inwardly into the take-up chamber for engaging the chart record.

A chart supply chamber 50 is defined by back wall 52 and a side wall 54, which are attached to top plate 40 and the base plate by bolts 46, or the like.

A drive pulley 60 is supported between the chassis 12 and top plate 40 by journals 62 and is connected to the driven gear 19 at its lower end. The drive pulley 60 bears sprockets 64 and 66 on rims at its upper and lower ends, respectively, which protrude therefrom for engaging and driving the record chart.

A sheath plate 70 is supported between chassis 12 and top plate 40 and partially surrounds drive pulley 60, between sprockets 64 and 66. Sheath plate 70 includes a substantially flat portion 72 which is bent inwardly along line 74 at one edge and a curved portion 76 which extends from the flat portion and partially encircles the drive pulley 60. A vertical post or column 78 is rigidly supported between chassis 12 and top plate 40 adjacent the sheath plate. Pointer 44 indicates a recording position in the cartridge mechanism.

A vertically oriented guide member 80 is supported between base plate 20 and top plate 40 at the front of the cartridge by pins 82 and 83, respectively. Coil springs 84 and 85 are attached to base plate 20 and top plate 40, respectively, and to guide member 80 for rotatably biasing guide member 80 in a counterclockwise direction. Guide member 80 comprises a curved portion 86 bearing inwardly extending nubs or ribs 87 and fingers 88 which bear against the front surface of the record chart proximate the curved portion 76 of the sheath plate 70. The fingers 88 maintain the record chart in engagement with sprockets 64 and 66 above and below the sheath plate and nubs or ribs 87 urge the record chart into the take-up chamber after it leaves the sprockets.

A door 90 is supported between base plate 20 and top plate 40 at the rear of the cartridge by pins 92 and is biased in a clockwise direction by coil spring 95 which is attached to the top plate and the door itself. Rear door 90 bears a plurality of inwardly protruding nubs or ribs 96 which bear against the record chart proximate the post or column 78 to assure that only one fold at a time is pulled from the chart supply chamber 50 by the mechanism. A tab 98 extends from the rear door 90 to enable an operator to open the door for conveniently threading a record chart from supply chamber 50 and around the sheath plate 70 when reloading.

In operation, rear door 90 which is pivoted on pins 92 and is spring-loaded against post 78 provides a tapered throat from chart supply chamber 50. This tapered throat assures that only one fold at a time is pulled from the record chart pack that is placed in chamber 50. If more than one fold slips out of supply chamber 50, the tapered throat defined by rear door 90 separates the folds by friction and by bowing the record chart so that only one thickness of the supply chart will pass out of the throat and around the post 78 to the drive pulley.

Once the record chart passes across sheath plate 70 and around drive pulley 60, it passes beneath vertical guide member 80. Guide member 80, together with fingers 88, is formed with a double curvature in an S-configuration which urges the record chart back toward the rear wall 34 of take-up chamber 30 as it leaves the drive pulley. Each time the record chart contacts rear wall 34 of the take-up chamber an original fold in the chart is re-established and the chart beings to bow out toward the front of the take-up chamber until a reverse fold of the chart is re-established. Guide member 80 then again urges the record chart back toward rear wall 34 of the take-up chamber to re-establish yet another fold in the chart. This process of re-establishing alternate reverse folds of the record chart in the take-up chamber 30 occurs whether the chart is driven continuously or in steps and is aided by the memory of the paper as to the original folds. Further, as the folds in the chart are re-established in the take-up chamber, they are urged by guide member 80 and by the slope of floor 26 of the take-up chamber toward side wall 32 of the chamber and are held there by frictional engagement at the rear by ribs 36 on the back wall 34 of the chamber.

In FIG. 2, there is illustrated a chart transport cartridge 110 for the display of a wide portion of a rolled chart. This cartridge includes a transport chassis 12 substantially identical to that of transport cartridge 10 of FIG. 1. Transport cartridge 110 of FIG. 2 also includes a support post 14 for connecting the cartridge to a drive assembly and has a gear train journalled to it including a gear 16 for engaging a drive source, idler gears including gears 17 and 18, and a driven gear 19.

A supply roll spindle 150 is provided for receiving a rolled record chart. Spindle 150 is attached to the chart chassis 12 and includes tabs 154 at its lower end to support the chart roll.

A top plate 140 is spaced above and attached to transport chassis 12 by bolts 142 and 146. A sheath plate 125 is supported between the top plate and the transport chassis and is attached to top plate 140 by tab 127. A chart drive pulley 160 is supported between transport chassis 12 and top plate 140 and is connected to driven gear 19 and has sprockets 164.

A vertically positioned chart support 135 is attached to top plate 140 by bolts 137 and 146 as an extension from the drive roll assembly across the front of the cartridge and along a side toward the rear of the cartridge. A take-up roll assembly 180, which includes a clutch mechanism 182 and a base 184, receives the chart from support plate 135 and maintains tension on the chart for a smooth display and for compact take-up of the recorded chart.

In FIG. 3 of the drawing, a cartridge 110 for transporting and displaying a wide segment of a rolled chart is shown in position to be mated with a drive control assembly 200. As in the Z-fold cartridge 10 of FIG. 1, cartridge 110 includes a transport chassis 12 bearing a support post or column 14 and has journalled to it a drive train including a drive gear 16 having a center of rotation at 15 on the transport chassis and a driven gear 19 connected to drive pulley 160.

The drive control assembly includes an upper pivot 213 having an aperture 214 for receiving the tip of support post 14 of the transport chassis 12 of either cartridge 10 or 110, and which is fastened to the chassis 212 by fasteners 211. The drive control assembly 200 also includes a drive gear 216 journalled by gear shaft 215 to chassis 212 of the drive assembly. Drive gear 216 engages gear 16 of the chart transport cartridges for controlling advancement of the strip chart records therein.

One or more recording styli are positioned at location 218 on the drive control chassis 212 for engagement with the record chart supported on sheath 125 at approximately point 144 on the cartridge chassis. The details of one arrangement for controlling a recording stylus in such a mechanism may be seen in U.S. Pat. No. 3,725,949 issued to L. E. Friedline et al.

Figure 4:
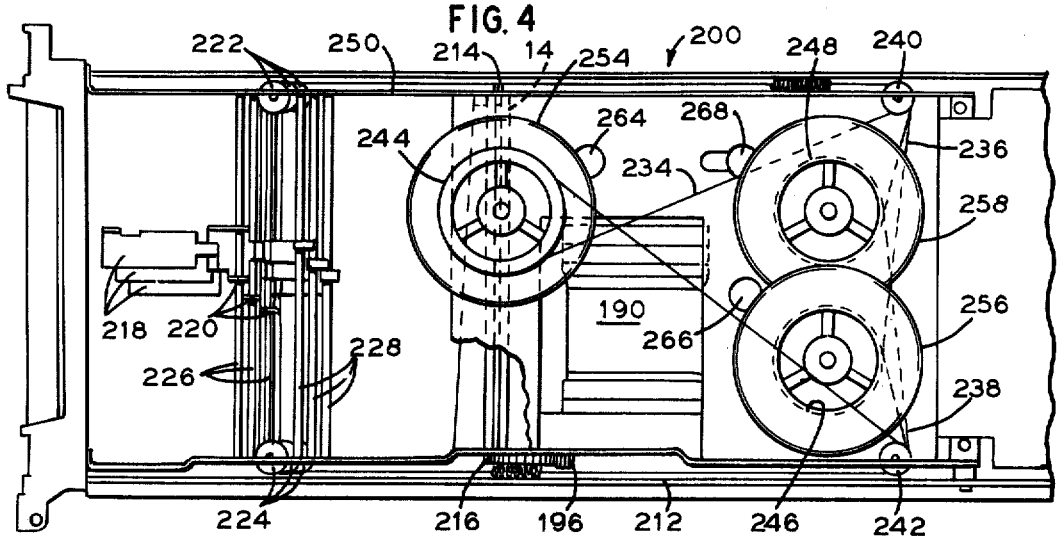

In FIG. 4, recording styli 218 are removably attached to holders 220 which are supported on columns 226 and 228 on which they are free to slide vertically. Each of the stylus holders 220 is connected to a different one of control wires or cords 234, 236, 238 which are threaded over pulleys 222, 224, 240, 242 and around one of the hubs or drums 244, 246, 248. Pulleys 254, 256, 258 are attached to drums 244, 246, 248 and are driven by wheels or gears 264, 266, 268 which engage their rims. Different servo-motors (not shown) are provided for controlling drive wheels 264, 266, 268 and their associated recording styli through drive cords 234, 236, 238.

A record cartridge having a support post or column 14 is engaged with aperture 214 in top plate 250 of the drive assembly 200, as shown. A motor 190 is provided for advancing the record in the cartridge through gears 196 and gear 216, which engages drive gear 16 of the cartridges.

While there is illustrated and described herein a specific embodiment of the invention, those skilled in the art will understand that changes may be made in the form of the invention covered by the claims, and that certain features of the invention may sometimes be used to advantage without a corresponding use of the other features.

The embodiments of the invention in which an exclusive property or privilege is claimed are defined as follows:

1. A transport cartridge for containing and horizontally transporting a Z-folded strip-chart maintained in vertical orientation comprising:
    a supply chamber for containing a Z-folded strip-chart
    a drive pulley for engaging said strip-chart in upright position from said supply chamber
    a take-up chamber having a floor which slopes away from said drive pulley at a preselected angle for receiving the strip-chart from said drive pulley
    a chassis vertically supporting said drive pulley, and take-up chamber
    and means for controllably rotating said drive pulley.

2. A transport cartridge as in claim 1 further including a sheath member for supporting said strip-chart proximate said drive pulley.

3. A transport cartridge as in claim 2 wherein said sheath member comprises a vertical plate having a curved portion which at least partially encircles a portion of said drive pulley.

4. A transport cartridge as in claim 2 further comprising a vertical guide member biased against said strip-chart proximate its egress from said drive pulley for urging the strip-chart into said take-up chamber and into an automatically refolding stack therein.

5. A transport cartridge as in claim 4 wherein said guide member comprises a vertical plate-like member formed in an S-shaped configuration and is spring-biased against said strip-chart at said drive pulley.

6. A transport cartridge as in claim 5 wherein said guide member includes one or more nubs or ribs on the inside surface thereof for bearing against said strip-chart and urging it into said take-up chamber.

7. A transport cartridge as in claim 2 further comprising a vertical post positioned between said supply chamber and said drive pully and a door biased against said post for passing only one opened fold at a time from said supply stack.

8. A transport cartridge as in claim 7 wherein said door has at least one nub or rib in its inside surface for bearing against the strip-chart passing between it and said post.

* * * * *